United States Patent [19]

Storey

[11] Patent Number: 5,263,745
[45] Date of Patent: Nov. 23, 1993

[54] PLASTIC TOW HITCH DEVICE

[75] Inventor: James B. Storey, Delta Junction, Ak.

[73] Assignee: The United States of America as represented by the Secretary of the Army, Washington, D.C.

[21] Appl. No.: 711,821

[22] Filed: Jun. 7, 1991

[51] Int. Cl.$^5$ .............................................. B62B 13/00
[52] U.S. Cl. ................................... 280/483; 280/493; 280/15
[58] Field of Search .............. 280/483, 482, 480, 494, 280/493, 492, 28.13, 24, 15, 460.1, 204

[56] References Cited

U.S. PATENT DOCUMENTS

| | | | |
|---|---|---|---|
| 3,721,454 | 3/1973 | Anderson | 280/24 |
| 3,731,946 | 5/1973 | Westcott | 280/24 |
| 3,829,125 | 8/1974 | Davis | 280/483 X |
| 4,307,893 | 12/1981 | Ragland | 280/204 |
| 4,353,563 | 10/1982 | Foster | 280/24 |
| 4,856,799 | 8/1989 | Hawn | 280/24 |

FOREIGN PATENT DOCUMENTS 1037276  8/1958  Fed. Rep. of Germany ...... 280/493

*Primary Examiner*—Joseph D. Pape
*Attorney, Agent, or Firm*—Saul Elbaum; Walter R. Baylor; Muzio B. Roberto

[57] ABSTRACT

A flexible and bowed tow hitch having a A-configuration is adapted for trailing a sled behind a snow vehicle. The hitch comprises three plastic straps; two straps form the legs for the A-configuration and the third strap forms the cross-bar for the A-configuration. The ends of the cross-bar strap are physically pressed against the respective ends of the leg straps to form the base terminal of the hitch for attachment to the sled. The other ends of the legs are physically pressed against each other to form the apex for the A-configuration. An elongated bar is embedded between these other ends. The bar is welded to a ring member to form a lunette-type connection for attachment to the snow vehicle.

2 Claims, 3 Drawing Sheets

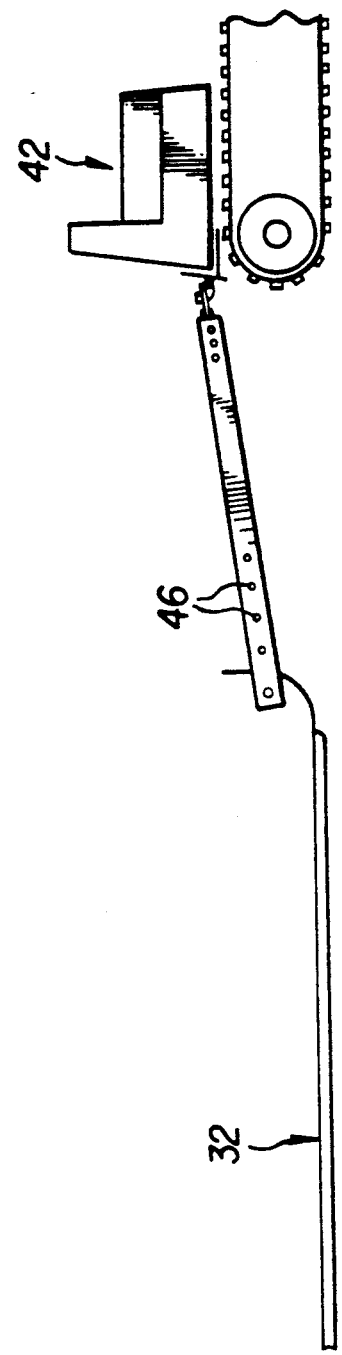

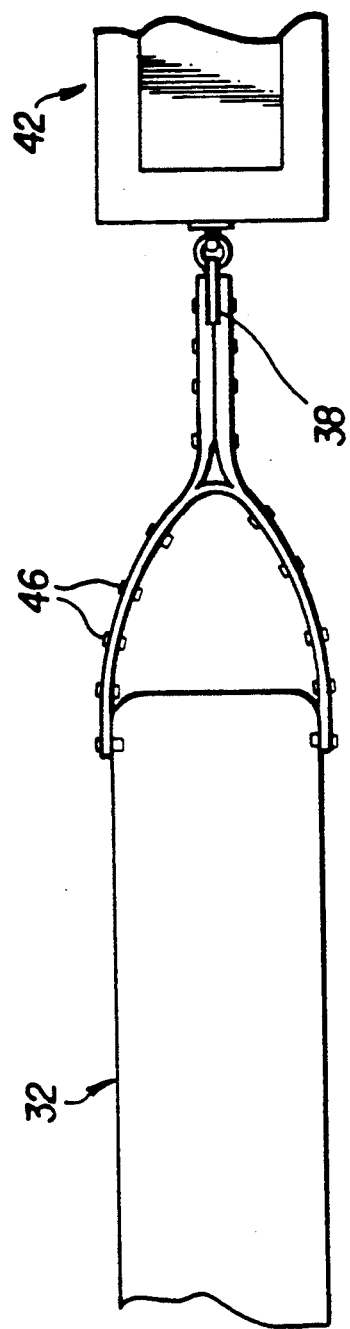

PLASTIC TOW HITCH DEVICE

RIGHTS OF THE GOVERNMENT

The invention described herein may be manufactured, used and licensed by or for the United States Government for Governmental purposes without payment to me of any royalty thereon.

BACKGROUND OF THE INVENTION

1. Field of the Invention

The present invention is directed to a sturdy and flexible plastic tow hitch or bar device, and more particularly to a new and improved tow hitch for use with snowmobiles and sleds in the transport of cargo in the colder snowy regions of the world.

2. A typical dimensioned "FoxBow"

The U.S. Army Cold Regions Testing Center CRTC designed and fabricated tow hitch, that is, the present invention, and is identified under the common name of "FoxBow." The "FoxBow" is configurated to allow storage in the sled hull. The "FoxBow" was constructed, for the above testing, of three straps of light weight, high strength polyethylene, a product of the Poly-Hi Company of the Menasha Corp. The materials of the straps are 0.5 inch thickness cut to 2 inches width. The two main legs or traces of the tow bar are 55 inches in length and the counter-flexed center strap is 72 inches in length. The leg straps and center strap are drawn together with eight machine screws with appropriate nuts and washers. Likewise the snowmobile connection end of the assembly is sandwiched between the leg straps with three machine screws. The lunette type of hitch tip is 2 inch steel bar stock with a welded ring. The ends of the legs or traces that connect to a sled are reinforced with a steel bushing and connection is made with either quick release pins or machine screws. Using this towing bar multiple sleds can be towed tandem fashion by simply connecting with standard snap-links. Field repair of a "FoxBow" is easily accomplished if ever necessary, a pre-cut and drilled extra strap could be carried and installed with minimal skills and tools.

3. The Prior Art a. The prior art discloses that the dynamic forces that are incurred when towing cargo laden sleds with snowmobiles has been destructive to the hitch points of the snowmobiles, the sleds, and the hitch tow bars themselves. This is compounded by the fact that when a snowmobile is moving over difficult terrain it is necessary to operate the snowmobile in an aggressive manner to maintain its momentum. Previously, sled hitches were constructed of metal, often fabricated with a coil spring type of a slip joint to absorb shock and stress. The metal hitches were overly heavy and did not serve their intended purposes well.

b. U.S. Pat. Nos. 3,721,454; 3,731,946; 4,353,563; and 4,856,799 disclose tow hitches or bars of the rigid metal type.

c. The present invention plastic hitch (FowBow) is light weight, tough, and provides a wide degree of flex effectively absorbing the major stresses that were previously imparted to the snowmobile and sled. The flexible nature of the counter-flexed "FoxBow" also facilitates connection to snowmobiles since perfect alignment is not necessary. This is especially important when performing these functions in deep snow.

SUMMARY AND OBJECTS OF THE INVENTION

The present invention relates to a flexible plastic tow hitch device for hitching a single sled to a snowmobile or hitching two or more sleds together in a tandem relationship to the snowmobile. A high-density high-strength light-weight polyethylene type of plastic was selected as the material for constructing the present invention plastic hitch that provided the desired characteristics.

Use of the present invention provides a plastic hitch having a wide degree of flexibility that effectively absorbs the major stresses that were previously imparted to the snow vehicle and to the towed sled.

Further, use of the present invention allows one to more easily perform the hitching operation in that the flexible and bowed nature of the plastic hitch facilitates the connections to the snow vehicle since perfect alignment is not necessary to achieve the connections. This feature is especially important when performing these functions in deep snow.

It is an object of the present invention to provide a light weight and high strength plastic tow hitch that can withstand the large dynamic forces that are created when the hitch is structurally associated with a snowmobile and sleds when they are being aggressively operated over heavy snowy and rough terrain.

It is a further object of the invention to provide a plastic tow hitch that provides a degree of flexibility to the operation of securing the hitch to a snowmobile and sled or to a series of sleds in a tandem arrangement.

It is a further object of the invention to provide a simply structured, compact and light weight plastic tow hitch that may be easily stored when not in use; for example, in the sled hull during transport.

The foregoing and other objects and advantages of the invention will appear from the following description. In the description reference is made to the accompanying drawings which form a part hereof, and in which there is shown by way of illustration and not of limitation a preferred embodiment. Such description does not represent the full extent of the invention, but rather the invention may be employed in different arrangements according to the breadth of the invention.

BRIEF DESCRIPTION OF THE DRAWINGS.

In the drawings:

FIG 2 is a side elevational view of the plastic tow hitch device operatively associated with a towing snowmobile and a sled, both shown schematically and broken away to fore shorten the view; and FIG. 3 is a top plan view of the plastic tow hitch device operatively associated with the snowmobile and sled as shown in the FIG. 2 arrangement.

DESCRIPTION OF THE PREFERRED EMBODIMENT

Figure 1:
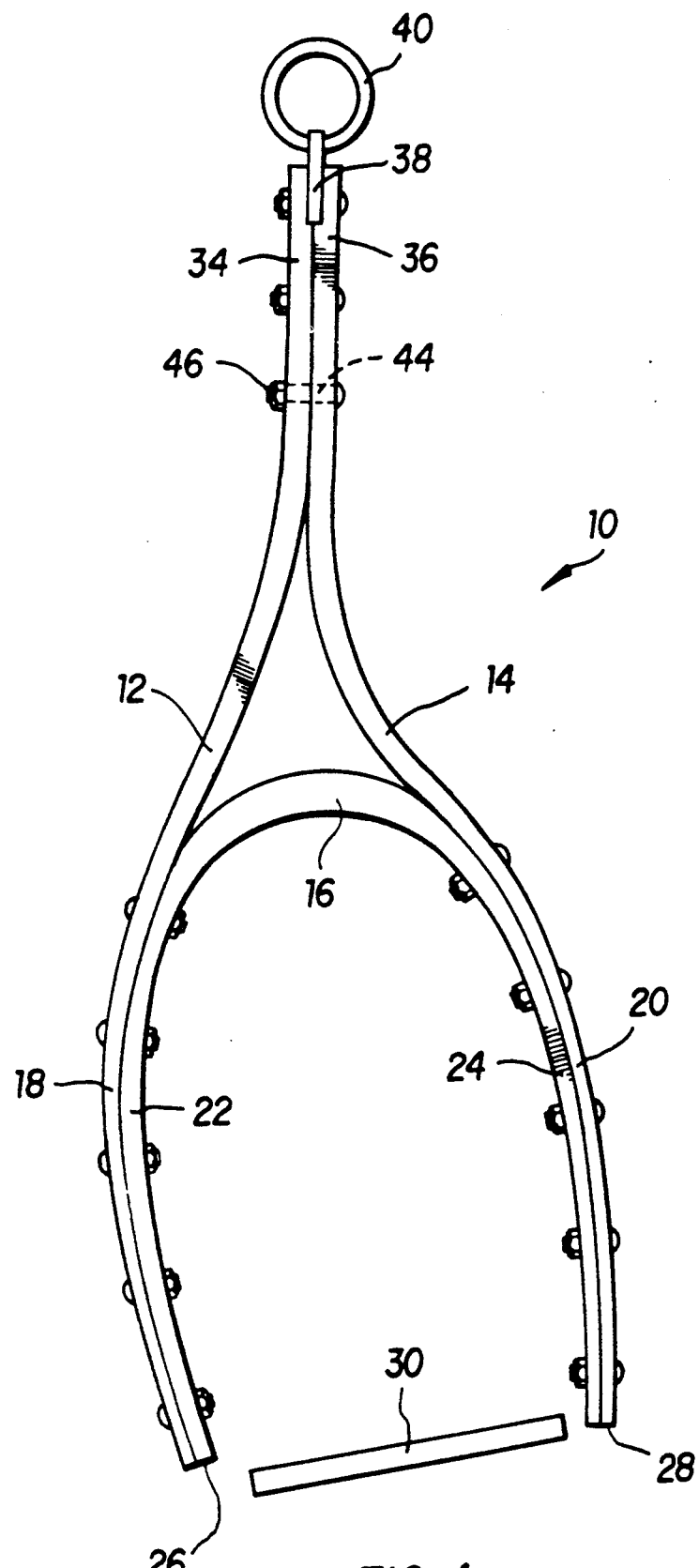
FIG. 1 is an enlarged top-plan view of a plastic tow hitch device embodying the present invention.

Referring to the drawings, like reference numerals represent identical or corresponding parts throughout the several views.

In the drawings, FIG. 1 shows an assembled tow hitch 10 in accordance with the invention. If unassembled, the tow hitch would include a pair of plastic straps 12 and 14 that are substantially equal in length and a third plastic strap 16 that is longer in length than the straps 12, 14. The tow hitch 10 is shown having an A-configuration. End section 18 of strap 12 partially forms one of the legs for the A-configuration. Likewise, end section 20 of strap 14 partially forms the other leg for the A-configuration. The longer third strap 16 forms the centrally located cross bar for the A-configuration. The strap has end sections 22 and 24 adjacent end sections 18,20 of straps 12,14, respectively.

End sections 22, 24 of the third strap 16 are counterflexed to physically press against the respective end sections 18, 20 of the leg strap members 12, 14, respectively, to form combined leg members, as shown in FIG. 1. Accordingly, the end of the combined leg member 18, 22 (strap 12) provides a terminal 26 for tow hitch 10. Likewise, the end of combined leg member 20, 24 (strap 14) provides a terminal 28 for tow itch 10, spaced a short distance from the terminal 26. Straps 12 and 14 form the base of the A-configuration. Straps 12 and 14 are shown in FIG. 1 as being bowed to one side. This provides a flexible characteristic to the tow hitch 10 which makes it easy for one to insert it between two snow vehicles. Further, the flexible characteristic provides a means of absorbing shock during the travel of the snow vehicles. The leg members are referred to as traces in the art. A snap-type link bar 30 or an equivalent conventional type hardware fasteners provides the connection between the terminals 26,28. The terminals 26,28 and the link bar 30 operatively provide a connecting means between the tow hitch 10 and a snow vehicle; e.g. a sled 32. The sled 32 is shown schematically and broken away to fore shorten the views i FIGS. 2 and 3.

The other end sections of straps 12, 14 are numbered 34 and 36, respectively. The end sections 34, 36 are physically pressed against each other to form a combined longitudinal apex section for the A-configuration. This combined apex section 34,36 is similar to the described combined leg members 18,22 and 20,24. The apex section 34,36 is provided with a hitch tip 38 which consist of a short steel bar stock connected by welding to a ring 40. This lunette-type fastener operatively provide a connecting means between the tow hitch 10 and a snow vehicle; e.g., a snowmobile 42. The snowmobile 42 is shown schematically and broken away to fore shorten the views in FIGS. 2 and 3.

The combined leg members 18,22 and 20,24 and combined apex section 34,36 have been provided with holes 44 at selective locations along their respective lengths. One dotted line section is shown as an example of the hole 44. Each of the combined leg members 18,22 and 20,24 and the combined apex section 33,36 are drawn together by machine screws with appropriate nut and washer assembly, an example of which is identified by number 46.

It is to be understood that the respective terminals for combined leg members and apex section may be reinforced with suitable hardware; e.g. steel bushings. Further, the connection between the snowmobile 42 and the tow hitch 10 and also the connection between the sled 32 and the tow hitch 10 may consist of any of the normal type of connections used in hitching tow members to snow vehicles. For examples, attention is directed to the different types of connections in the above-identified prior art patents, U.S. Pat. Nos. 3,721,454; 3,731,945; 4,353,563; and 4,856,799.

The tow hitch 10 is preferably formed of a material such as light weight, high strength polyethylene. This plastic material enables one to make a strap of small diameter and at the same time is sufficiently sturdy for use as a strap for a hitch for towing heavy snow vehicle in adverse snow conditions. Thus, the invention provides a plastic tow hitch that is strong and flexible as well as one that may be manipulated in a confined space between a snow vehicle and a sled which is important in operatively connecting the hitch.

The light-weight and flexible nature of the two hitch 10 enables a snowmobile operator to manipulate it in position to connect one end to a snowmobile and the other end to a sled. Both the weighty snowmobile and a loaded sled situated in heavy snow can be difficult to move even a small distance whereby the tow hitch can be placed in an operatively connecting position between the snowmobile and the sled. Thus, the flexibility of the tow hitch 10 represents a substantial advantage in making a readily easy connection under adverse conditions.

By using the tow hitch 10 of this invention, multiple sleds can be readily towed in a tandem fashion by connecting them with standard snap-links. Field repair of the tow hitch of this invention may be accomplished in many instances by the carrying of extra pre-cut and drilled straps which can be installed with minimal skills and tools.

While a particular embodiment of the present invention has been shown and described, it will be obvious to those skilled in the art that changes and modifications may be made without departing from this invention. Therefore, it is intended that the claims herein are to include all such obvious changes and modifications as fall within the true spirit and scope of this invention.

I claim:

1. A tow hitch having a substantially A-configuration, and adapted to be inserted between two snow vehicles, comprising in combination,
   first and second strap members constructed of a light weight plastic having end sections which partially form first and second legs of the A-configuration,
   a center strap member constructed of a light weight plastic, and having an inverted U-configuration positioned between the first and second strap members, and having end sections that extend along the end sections of the first and second strap members to completely form the legs of the A-configuration,
   the first and second strap members being attached to each other at the apex of the A-configuration, and the center strap member being attached to the end sections of the first and second strap members,
   means attached to the apex and the terminal ends of the legs of the A-configuration of the tow hitch for connecting with other snow vehicles.

2. A tow hitch according to claim 1 and further including ring means attached to the apex of the A-configuration, and an elongated bar means physically pressed between the legs of the A-configuration at the terminal ends thereof.

* * * * *